Nov. 14, 1933.      H. S. HOLMES      1,934,854
PRODUCING AXLE HOUSINGS AND PARTS THEREOF
Filed Feb. 11, 1929      2 Sheets-Sheet 1
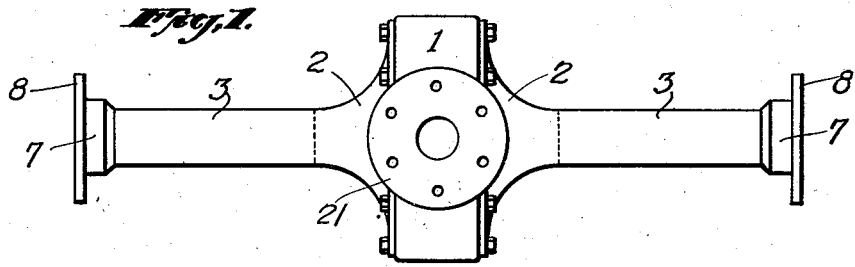
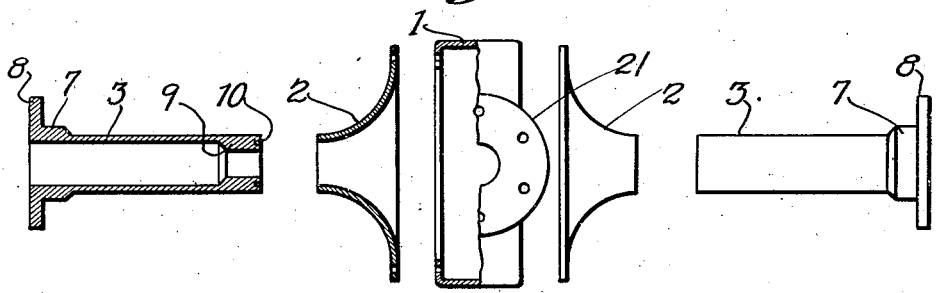
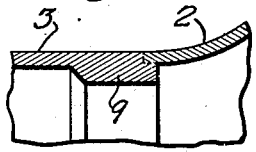 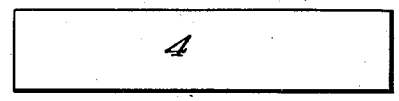
 
Inventor
HENRY S. HOLMES.
By his Attorneys Nov. 14, 1933.     H. S. HOLMES     1,934,854
PRODUCING AXLE HOUSINGS AND PARTS THEREOF
Filed Feb. 11, 1929     2 Sheets-Sheet 2

Inventor
HENRY S. HOLMES.
By His Attorneys
Usina & Rauber

Patented Nov. 14, 1933

1,934,854

UNITED STATES PATENT OFFICE

1,934,854

PRODUCING AXLE HOUSINGS AND PARTS THEREOF

Henry S. Holmes, Rockville Center, N. Y., assignor, by mesne assignments, to Metropolitan Engineering Company, Brooklyn, N. Y., a corporation of New York Application February 11, 1929. Serial No. 339,024

8 Claims. (Cl. 74—56)

The invention aims to provide certain axle housings and parts and an economical method of producing the same. The accompanying drawings illustrate the invention in connection with a drum type of rear axle housings for automobiles.

Fig. 1 is a front elevation of a completed housing.

Fig. 2 is a similar view half in section and with the parts separated.

Fig. 3 is a detail showing the joints between certain parts of Fig. 2.

Fig. 4 is a plan of a flat blank used in making one of the end members.

Fig. 5 is a side elevation partly in section, and Fig. 6 an end elevation of a thin walled tubular blank.

Fig. 7 is a side elevation partly in section showing a tubular blank with an end upset, representing an intermediate stage in making an end member.

Figure 11:

Fig. 11 an end view of a flat blank.

Figure 12:
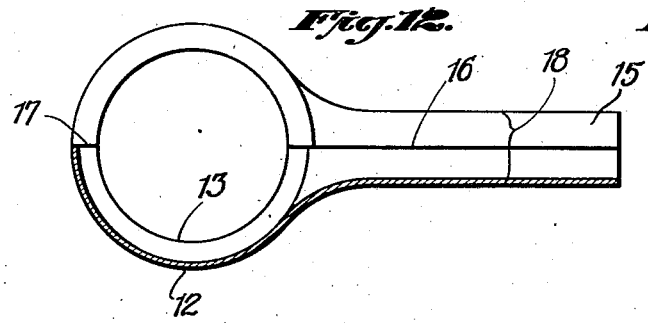
Figure 13:
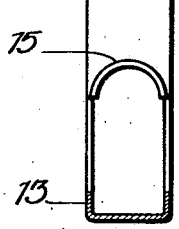

Fig. 12 is a side elevation and half section, and Fig. 13 an end elevation and half section of a tubular blank.

Figure 14:
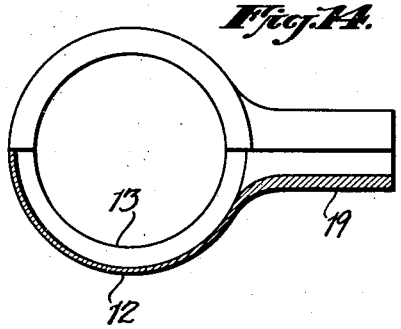

Fig. 14 is a side elevation partly in section of the tubular blank with its end thickened by upsetting.

Figure 8:
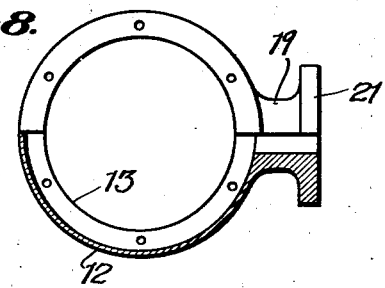
Fig. 8 is a side elevation, partly in section.
Figure 15:
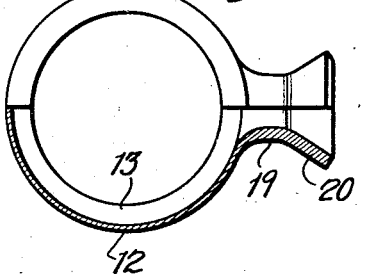

Fig. 15 is a similar view showing the end bent outward obliquely, representing an intermediate stage in the production of the drum of Fig. 8.

Referring first to Figs. 1 and 2, the housing is made of a central drum member 1 on the axial ends of which are conical or tapered connecting members 2 bolted to the drum and welded to tubular end members 3.

Each end member is formed from flat blanks 4 of thin sheet metal of uniform gauge. These are bent to form semi-circular segments and welded along their edges to form a tube 5, Figs. 5 and 6, the welded joints being indicated at 6. This is a tubular blank having a thin wall corresponding in gauge and diameter to the intermediate portion of the end member. It is however much longer than the end member so as to provide extra metal at the ends for upsetting. The weld is a resistance weld made by pressing the parts together while passing a current of extremely high amperage for a brief period; as for example in the Murray reissue Patent No. 15,466, dated October 10th, 1922. This method of welding is important in connection with the subsequent upsetting since arc or gas welding will not stand the strain.

After removing the fins formed by the welding operation, the outer end of the tubular blank is upset as at 7, Fig. 7. In the next operation (or series of operations) the thickened end 7 is swaged to form the flange 8 (Fig. 2) and the inner end is upset and spread internally to form the increased thickness 9. The end 9 is shaped to leave an annular rib 10 of substantially the thickness of the connecting member 2 and the small end of the latter is welded thereto preferably also with a resistance weld as shown in Fig. 3. The inner portion of the thickened end 9 projects into the member 2 and centers the latter accurately.

This method of producing the end tubes from the segments having the gauge of the thinnest portion and subsequently increasing the thickness at the ends has advantages in the production of various other hollow articles and is claimed in a copending application, Serial No. 339,023, filed February 11, 1929 the claims of the present application being restricted to axle housings and parts thereof.

When the two finished end pieces are welded to the connectors 2 and the latter bolted to the drum member, the end flanges 8 serve as supports for brakes and other parts of the car and the internal upset rings 9 form bearings for the shafts. These bearings being provided in the end tubes, the connectors 2 can be reduced to simple stampings or drawn shapes from sheet metal. The end tubes may be either straight as shown or tapered and they may be made of seamless tubing, though the method described is more economical, and particularly so for tapered tubing.

Figure 10:
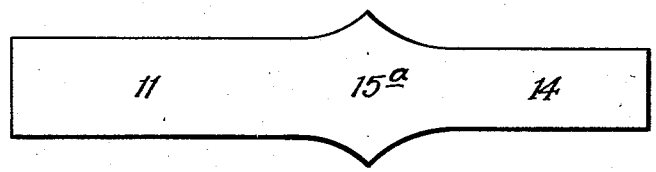
Fig. 10 is a plan.

The preferred method of making the drum is similar to that of making the end tubes. We start with two flat blanks, Figs. 10 and 11, of thin sheet metal having a portion 11 which is bent about a transverse axis to form a half ring 12 (Fig. 12) with longitudinal flanges 13. The opposite end 14 of the blank is bent up into a semicircular segment 15, Figs. 12 and 13, about the longitudinal axis of the blank. The intermediate portion 15ª of the blank is widened and pointed to complete the semi-annular shape of the flanges 13. Two such blanks are brought together as indicated in Fig. 12 and are welded together along the lines 16 and 17 to provide a drum with a long tube 18 of thin sheet metal at its front side for passage of the driving shaft. The weld 16 is preferably made by the Murray or similar resistance method above described so as to withstand without injury the subsequent upsetting strains.

Figure 9:
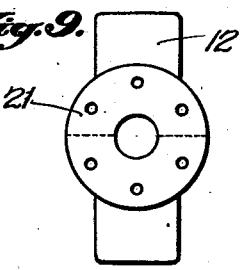
Fig. 9 is a front elevation of the drum member.

The tubular stem 18 of the drum is then upset as in Fig. 14 to convert it to a shorter thick-walled stem 19. This in turn is swaged and bent out to form an oblique flange 20, Fig. 15. And finally it is bent to the finished shape of Figs. 8 and 9 with a square flange 21, and provided with bolt holes for attachment of tubing enclosing the driving shaft. The flange 13 is similarly punched with bolt holes for attachment of the connectors 2, Fig. 1.

In the previous manufacture of drum housings some of the parts have been forged to secure strong pieces of varying thickness. Such forging operations are difficult where a comparatively thick blank has to be reduced to form a thin wall. By starting with a blank gauged to the thinnest part of the piece and thickening it at certain points, this invention greatly facilitates the production of the pieces and of the housing.

Various modifications in the shapes of the parts and the manner of connecting them may be made by those skilled in the art without departing from the invention as defined in the following claims.

What I claim is:

1. An axle housing comprising a central drum with a hollow lateral stem, tapered connectors of sheet metal having their larger ends united to the axial ends of the drum, and end tubes welded to the smaller ends of the connectors, said tubes being upset at the inner ends to provide shaft bearings of increased thickness integral with said tubes.

2. An axle housing comprising a central drum with a hollow lateral stem, tapered connectors having their larger ends united to the axial ends of the drum, and end tubes united to the smaller ends of the connectors, said tubes having integral shaft bearings at their inner ends, which bearings project into the adjacent ends of the connectors.

3. An axle housing comprising a central drum with a hollow lateral stem, tapered connectors having their larger ends united to the axial ends of the drum, end tubes united to the smaller ends of the connectors, and shaft bearings lying partly within said tubes and partly within the adjacent ends of the connectors.

4. An axle housing comprising a central drum with a hollow lateral stem, tapered connectors having their larger ends united to the axial ends of the drum and end tubes united to the smaller ends of the connectors, said parts being formed of sheet metal, which is upset at said stem to provide an increased thickness of metal integral with the remainder of the drum and at the inner ends of said tubes to provide shaft bearings of increased thickness integral with said tubes.

5. An axle housing comprising a central drum with a hollow lateral stem, tapered connectors having their larger ends united to the axial ends of the drum and end tubes united to the smaller ends of the connectors, said parts being formed of sheet metal which is upset at said stem to provide an increased thickness of metal integral with the remainder of the drum and at the inner ends of said tubes to provide shaft bearings of increased thickness integral with said tubes, and at the outer ends of said tubes to form integral supports for external parts.

6. A central drum for axle housings, said drum having a lateral stem and comprising two identical segments of sheet metal welded together along edges in a plane parallel to the axis of the stem, each segment having opposite end portions forming respectively part of the drum and part of the stem and an intermediate wider portion forming a flange portion of the drum at the inner end of the stem.

7. A central drum for axle housings, said drum having a lateral stem and comprising two identical segments of sheet metal welded together along edges in a plane parallel to the axis of the stem, each segment forming part of the drum and part of the stem, and the stem ends being upset to an increased thickness.

8. An axle housing comprising a central drum having a lateral stem and having tubular extensions in opposite axial directions from said drum, said housing being made of sheet metal parts upset to provide an increased thickness of metal for bearings at said stem and the ends of said extensions and also at points between the drum and the ends of said extensions.

HENRY S. HOLMES.